(12) United States Patent
Kitamura et al.

(10) Patent No.: US 7,057,154 B2
(45) Date of Patent: Jun. 6, 2006

(54) OPTICAL DISPLACEMENT SENSOR AND EXTERNAL FORCE DETECTING DEVICE

(75) Inventors: Atsushi Kitamura, Shizuoka-ken (JP); Shigeyuki Adachi, Shizuoka-ken (JP); Sawa Tanabe, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 74 days.

(21) Appl. No.: 10/847,074

(22) Filed: May 17, 2004

(65) Prior Publication Data

US 2004/0232318 A1  Nov. 25, 2004

(30) Foreign Application Priority Data

May 20, 2003  (JP)  ............................. 2003-141421
Aug. 25, 2003  (JP)  ............................. 2003-299827
Feb. 26, 2004  (JP)  ............................. 2004-051698

(51) Int. Cl.
*G06M 7/00* (2006.01)
*G09G 5/08* (2006.01)

(52) U.S. Cl. ...................................... 250/221; 345/161

(58) Field of Classification Search ................ 250/221, 250/231.1; 356/152.3; 359/529, 546; 345/161
See application file for complete search history.

(56) References Cited

U.S. PATENT DOCUMENTS 5,117,305 A * 5/1992 Dey ............................ 359/529

FOREIGN PATENT DOCUMENTS

JP  03211417 A *  9/1991

* cited by examiner

*Primary Examiner*—Georgia Epps
*Assistant Examiner*—Brian J. Livedalen
(74) *Attorney, Agent, or Firm*—Muirhead and Saturnelli, LLC

(57) ABSTRACT

An optical displacement sensor in an external-force detecting device comprises a light source, an optical sensor, and a light reflecting means. The light source and the optical sensor are disposed at an action section of the device adapted to receive an external force, and the light reflecting means is disposed at a support section of the device adapted to support the action section via elastic spoke sections, and light emitted from the light source is reflected at the light reflecting means and received at the optical sensor whereby displacement of the action section relative to the support section is detected for calculation of an external force applied.

8 Claims, 12 Drawing Sheets

Incoming light   C   Reflected light

Incoming light        Reflected light

OPTICAL DISPLACEMENT SENSOR AND EXTERNAL FORCE DETECTING DEVICE

BACKGROUND OF THE INVENTION

1. Field of the Invention

The present invention relates to an optical displacement sensor, and an external force detecting device, and more particularly to an optical displacement sensor to detect positional displacement of a measurement object in relation to a reference object by sensing displacement of a light receiving position, and to an external force detecting device to detect an external force applied to the measurement object according to an output signal from the optical displacement sensor.

2. Description of the Related Art

An external force detecting device, such as a six-axis optical force sensor, is conventionally known, in which an amount of displacement of an action section for receiving an external force, namely a measurement object, relative to a support section for supporting the action section, namely a reference object is detected by an optical displacement sensor, and an external force applied to the action section is calculated according to an output signal from the optical displacement sensor.

For example, a six-axis optical force sensor comprises optical displacement sensors to measure displacements, based on which forces are calculated with respect to six-axis directions. Such a six-axis optical force sensor comprises three optical displacement sensors, each of which includes an optical sensor unit and is capable of measuring displacements with respect to two-axis (X and Y) directions. The optical sensor unit comprises a light emitting diode (LED) as a light source and a photodiode (PD) assembly as a light receiving element such that the LED opposes the PD assembly with their respective optical central axes aligned to each other. The PD assembly is composed of four PD's and receives light emitted from the LED at its center area equally shared by the four PD's, whereby displacement of light receiving position at the PD assembly, that is to say relative positional displacement between a component attached to the LED and a component attached to the PD assembly can be detected in the optical displacement sensor. In such a six-axis optical force sensor, six-axis force applied between the component attached to the LED and the component attached to the PD assembly is calculated according to an output signal from each of the optical displacement sensors.

FIG. 1 is a plan view of a conventional six-axis force sensor disclosed in Japanese Patent Application Laid-Open No. H03-245028. A six-axis force sensor 1 shown in FIG. 1 is structurally composed of a cylindrical main body, and top and bottom lids (not seen). The main body is constituted basically by a frame 5, which integrally includes: a cylindrical support section 2; an action section 3 located centrally inside the support section 2 and adapted to receive an external force; and three elastic spoke sections 4 crookedly structured so as to be duly deformed elastically in all directions and supportably connecting the action section 3 to the support section 2. The frame 5 is made of a single piece of an aluminum alloy material and shaped by cutting and electric discharge machining. The support section 2 and the action section 3 are fixedly connected respectively to two components to which a measurement force is applied, and when the applied force acts on the six-axis force sensor 1 structured as described above, micro-displacements with respect to three-axis directions and micro-rotations with respect to rotational directions thereabout are generated between the support section 2 and the action section 3.

The six-axis force sensor 1 further includes three light sources 6 disposed at the inner circumference of the support section 2 at 120 degree intervals (i.e. at an equi-angular distance), and three optical sensors (light receiving elements) 8 disposed at the action section 3 at 120 degree intervals (i.e. at an equi-angular distance) so as to oppose respective three light sources 6 with mutual optical axes aligned to each other. Each optical sensor 8 and each light source 6 disposed opposite to the optical sensor 8 make up an optical sensor unit (optical displacement sensor) 9.

FIG. 2 is an explanatory perspective view of the optical sensor unit (optical displacement sensor) 9 of FIG. 1. As shown in FIG. 2, each of the optical sensors 8 is constituted by a PD assembly composed of four PD's 8a. The light sources 6 disposed opposite to respective optical sensors 8 are each constituted by an infrared high-intensity LED with a pinhole aperture provided at its front face, and light emitted from the LED and passing through the pinhole aperture propagates diffusedly and impinges on the center portion of the optical sensor 8 so as to be substantially equally irradiated on all the four PD's 8a. If the support section 2 and the action section 3 are displaced relative to each other by an external force, then the light emitted from the LED is irradiated unequally on the four PD's 8a, and light amounts received at respective four PD's 8a are measured for calculation of relative displacements with respect to X and Y axis directions. And, the six-axis force sensor 1 calculates forces with respect to six-axis directions according to the above-calculated relative displacements, and a signal is outputted therefrom.

The aforementioned conventional six-axis force sensor, i.e., external force detecting device has the following problems. Since LED'S, and PD assemblies to receive light emitted from the LED's are fixed respectively to different sections (specifically in FIG. 1, the light sources 6 (=LED's) are fixed to the support section 2 while the optical sensors 8 (=PD assemblies) are fixed to the action section 3), wires connected to the LED's and the PD assemblies are installed apart from each other thus making the wiring work troublesome, and also alignment work of optical axes between the LED and the PD assembly is also very troublesome.

SUMMARY OF THE INVENTION

The present invention has been made in light of the above problems, and it is an object of the present invention to provide an optical displacement sensor which comprises light sources and light receiving elements, and for which wiring work can be implemented without difficulty, and for which optical axis alignment work between the light source and the light receiving element can be easily accomplished, and also to provide an external force detecting device which calculates an external force according to an output signal sent from the optical displacement sensor.

In order to achieve the object, according to a first aspect of the present invention, according to a first aspect of the present invention, an external force detecting device comprises: an action section to receive an external force; a support section to support the action section; and at least one optical displacement sensor including a light source, a light receiving element, and a light reflecting means. In the external force detecting device, the light source and the light receiving element are disposed at one of the action section and the support section while the light reflecting means is disposed at the other one thereof at which the light source and the light receiving element are not disposed, wherein light emitted from the light source is reflected at the light reflecting means and received at the light receiving element, whereby displacement of the action section in relation to the support section is detected and outputted as a signal according to which an external force applied to the action section is calculated. Since the light source and the light receiving element are disposed at one same section of the device, wires of the light source and the light receiving element can be installed together making the wiring work easier, and since the light source and the light receiving element are disposed on one same plane of the section, optical axes of the light source and the light receiving element can be aligned to each other easily.

In the first aspect of the present invention, the optical displacement sensor may be capable of detecting displacement with respect to two-axis directions of a plane perpendicular to an optical central axis of light emitted from the light source. Consequently, the aforementioned advantages are available while displacement can be detected in a conventional way.

In the first aspect of the present invention, the light reflecting means may define two reflection surfaces which make an angle of 90 degrees with each other, and which respectively make an angle of 45 degrees with the optical central axis of light emitted from the light source, and a direction in which the two reflection surfaces oppose each other may coincide with an intermediate direction between the two-axis directions with respect to which displacement is detected. Consequently, also, the aforementioned advantages are available while displacement can be detected in a conventional way.

In the firs aspect of the present invention, the light reflecting means may be constituted by one of a trapezoidal prism, a triangular prism, and a dove prism. Consequently, the aforementioned advantages are available while employing a light reflecting means which is readily available at a reduced cost.

In the first aspect of the present invention, the light source and the light receiving element may be disposed in one and the same housing. Consequently, the aforementioned advantages are available even with improved easiness, and also downsizing is achieved.

In the first aspect of the present invention, the light source may be constituted by a light emitting diode, and the light receiving element may be constituted by a photodiode. Consequently, the aforementioned advantages are available while employing a light receiving element which is readily available at a reduced cost.

In the first aspect of the present invention, a plurality of optical displacement sensors may be provided, and the two-axis directions with respect to which displacement is detected may be oriented different from one optical displacement sensor to another. Consequently, the aforementioned advantages are available while various axis direction forces, not only two-axis directions, can be detected.

In the first aspect of the-present invention, the light reflecting means may define first, second and third reflection surfaces, wherein the first reflection surface reflects light emitted from the light source in a direction perpendicular to an optical center axis of the light, the second reflection surface reflects light coming from the first reflection surface in a direction perpendicular to an optical center axis of the light coming from the first reflection in a plane perpendicular to the light coming from the light source, and wherein the third reflection surface reflects light coming from the second reflection surface in a direction toward the light receiving element. Consequently, the aforementioned advantages are available while displacement can be detected in a conventional way. Also, the displacement amount of light received at an optical sensor is $\sqrt{2}$ times as large as the displacement amount of a light reflecting means composed of three reflector members, thus resulting in improving the accuracy of detection.

In the first aspect of-the present invention, the light reflecting means may be constituted by one of a triangular prim assembly and a mirror assembly. Consequently, the aforementioned advantages are available while employing a light reflecting means which is readily available at a reduced cost.

In the first aspect of the present invention, the light reflecting means may be constituted by a retro-reflector member, and the retro-reflector member may be a corner cube mirror. Consequently, when the Mz force couple is applied, detection of displacement with respect to the Y axis direction is prevented. Also, the displacement amount of light received at the optical sensor is two times as large as the displacement amount of a light reflecting means constituted by a corner cube mirror, thus resulting in improving the accuracy of detection.

According to a second aspect of the present invention, an optical displacement sensor comprises: a light source; a light receiving element; and a light reflecting means. In the optical displacement sensor, the light source and the light receiving element are disposed at one object while the light reflecting means is disposed at another object, wherein light emitted from the light source is reflected at the light reflecting means and received at the light receiving element, whereby displacement of the one object in relation to the another object is detected. Consequently, wires of the light source and the light receiving element can be installed-together thereby easing the wiring work, and optical axes of the light source and the light receiving element can be aligned to each other easily.

BRIEF DESCRIPTION OF THE DRAWINGS

The above object and other advantages of this invention will be better understood from the following detailed description taken in conjunction with the drawings wherein:

FIG. 17 is a graph of a test result on the six-axis force sensor of. FIG. 13A subjected to a force couple as shown in FIG. 14.

DETAILED DESCRIPTION OF THE PREFERRED EMBODIMENTS

The present invention will hereinafter be described with reference to the accompanying drawings. In the embodiments described below, a six-axis optical force sensor is taken as an example of an external force detecting device, but the present invention is not limited to a device for detecting six-axis forces.

Figure 1:
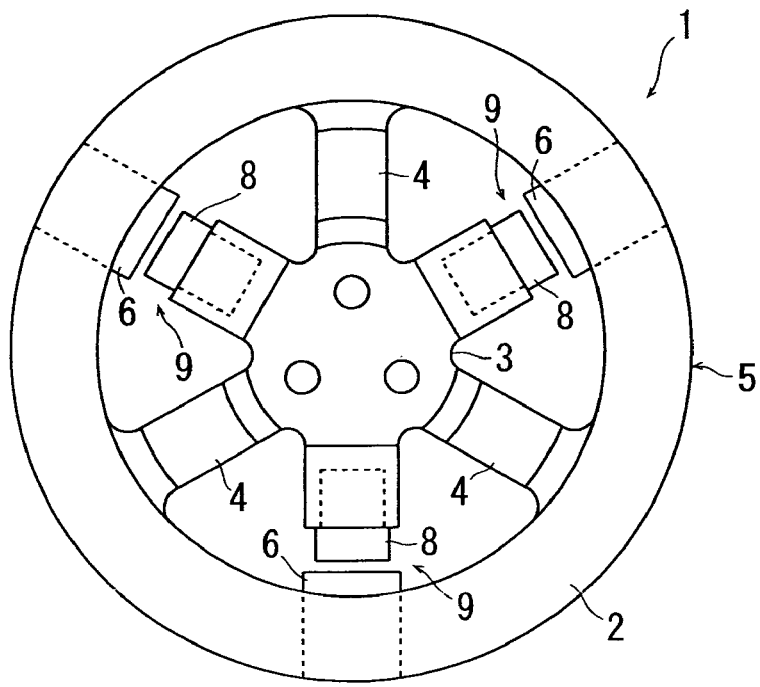
FIG. 1 is a plan view of a main body of a conventional six-axis force sensor.
Figure 2:
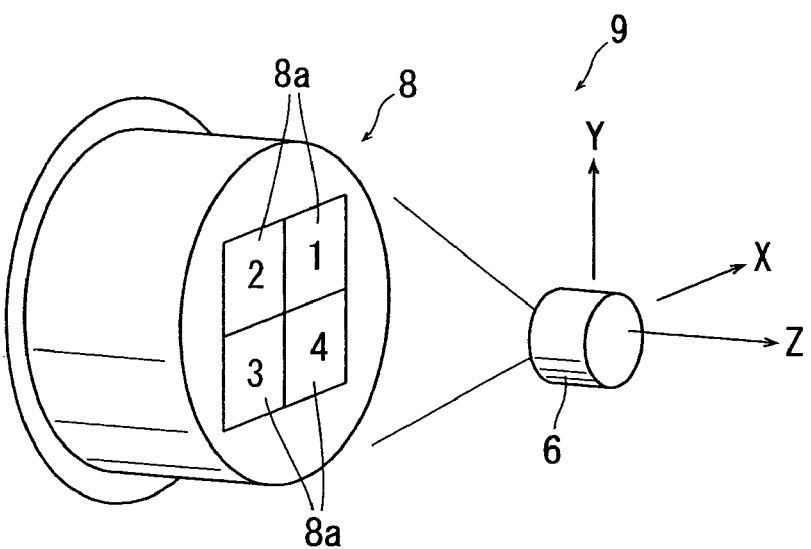
FIG. 2 is an explanatory perspective view of a conventional optical sensor unit shown in FIG. 1.
Figure 3:
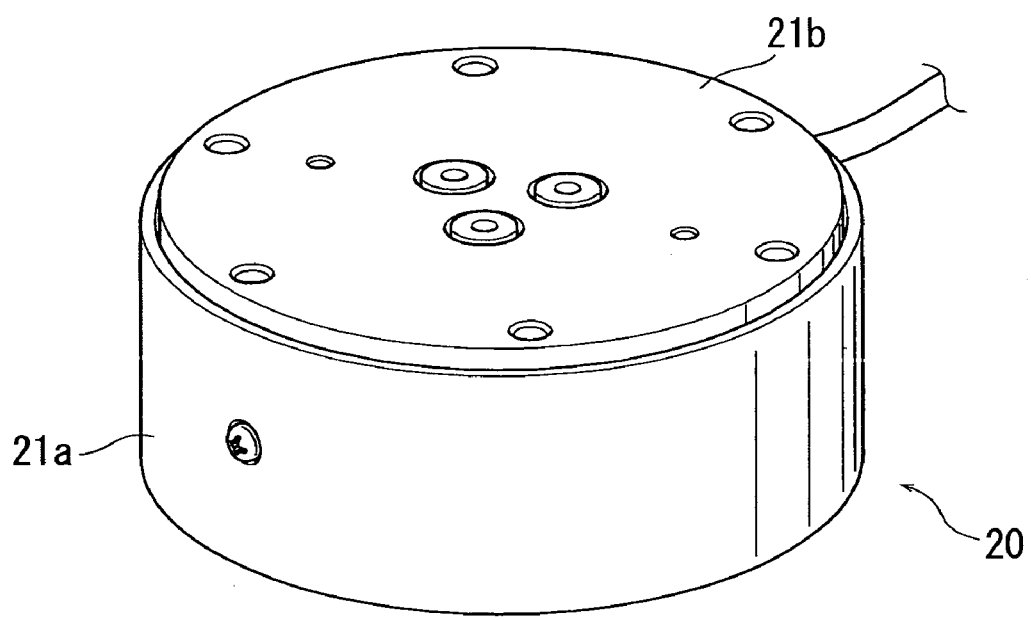
FIG. 3 is a perspective view of a six-axis force sensor according to a first embodiment of the present invention.
Figure 4:
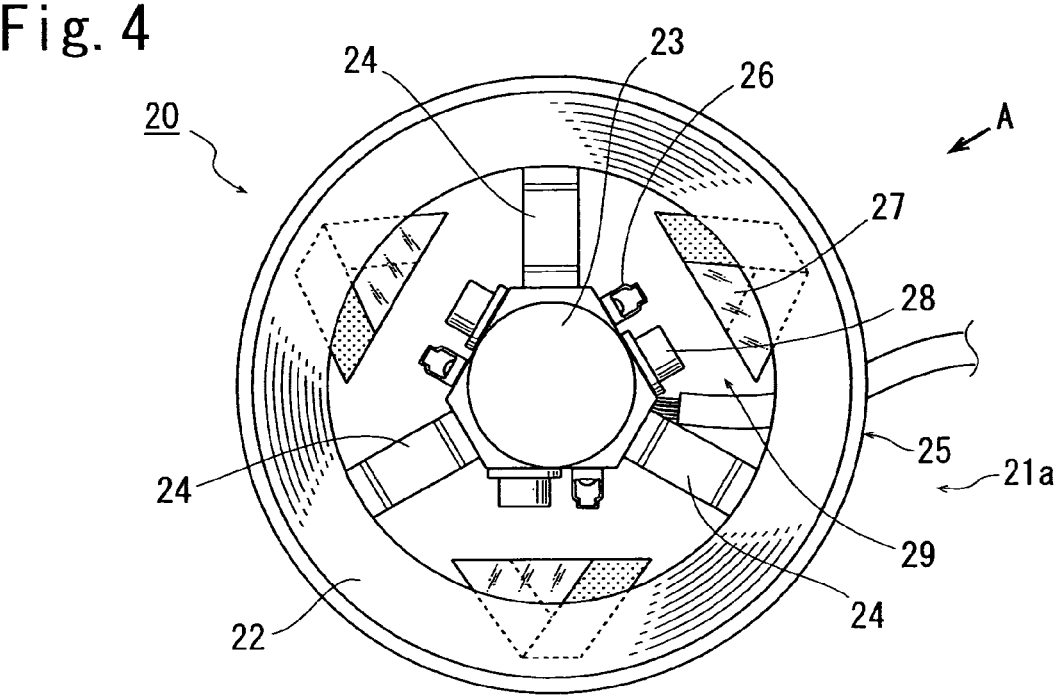
FIG. 4 is a top plan view of a main body of the six-axis force sensor of FIG. 3.

Referring to FIG. 3, a six-axis force sensor 20 according to a first embodiment of the present invention is structurally composed of a cylindrical main body 21a, a disk-like top lid 21b, and a disk-like bottom lid (not seen), and houses a control board (not seen) inside the main body 21a. Referring to FIG. 4, the main body 21a is constituted basically by a frame 25, which integrally includes: a cylindrical support section 22; an action section 23 disposed centrally inside the support section 22 and adapted to receive an external force; and three elastic spoke sections 24 and crookedly structured so as to readily provide elastic deformation in all directions and supportably connecting the action section 23 to the support section 22. The frame 25 is made of a single piece of an aluminum alloy material and shaped by cutting and electric discharge machining. The support section 22 and the action section 23 are fixed respectively to two components to which a measurement force is applied, and when the applied force acts on the six-axis force sensor 20 structured as described above, micro-displacements with respect to three-axis directions and micro-rotations with respect to rotational directions thereabout are generated between the support section 22 and the action section 23.

The six-axis force sensor 20 has three light reflecting means 27 disposed at the inner circumference of the support section 22 at 120 degree intervals (i.e. at an equi-angular distance), three light sources 26 disposed at the action section 23 at 120 degree intervals (i.e. at an equi-angular distance), and three optical sensors (light receiving elements) 28 disposed at the action section 23 at 120 degree intervals (i.e. at an equi-angular distance) so as to sit next to respective three light sources 26. One each of the light reflecting means 27, the light sources 26, and the optical sensors 28 constitute an optical sensor unit 29, where the light reflecting means 27 opposes the light source 26 and the optical sensor 28 sitting next to the light source 26.

Figure 5:
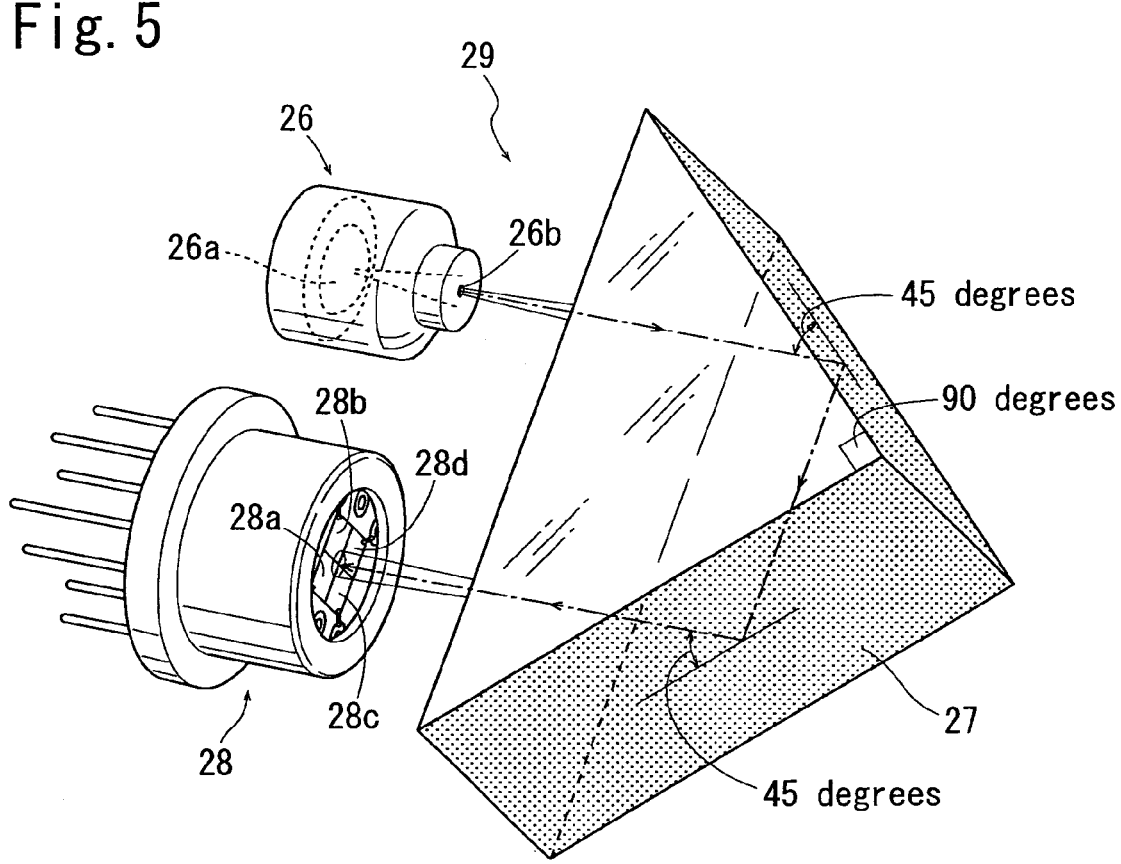
FIG. 5 is an explanatory perspective view of an optical sensor unit shown in FIG. 4.

Referring to FIG. 5, the light source 26 is constituted by an LED 26a with a pinhole aperture 26b provided at its front face, and light emitted from the LED 26a and passing through the pinhole aperture 26b propagates diffusedly, impinges on the light reflecting means 27, is reflected thereat, and is irradiated on the optical sensor 28.

Thus, the light source 26 and the optical sensor 28 are both disposed at the action section 23, whereby their wires can be installed together resulting in easier wiring work. Also, the optical axes of the light source 26 and the optical sensor 28, which are both disposed on the same plane at the action section 23 so as to sit next to each other, can be aligned to each other with less difficulty, and with further reduced difficulty when a housing is formed at the action section 23. And, the light source 26, the optical sensor 28, and also electronic circuit components such as an amplifier may be integrally packaged into an optical electronic component thereby enabling the six-axis force sensor 20 to be further downsized.

The light reflecting means 27 is constituted by a triangular prism having two reflection surfaces which make an angle of 90 degrees with respect to each other, and each of which is inclined at an angle of 45 degrees with respect to the optical axis of light emitted from the light source 26. The light reflecting means 27 may alternatively be constituted by a trapezoidal prism, a dove prism, or a plurality of mirrors (members each having a light reflection surface).

The optical sensor 28 is constituted by a PD assembly composed of four PD's 28a to 28d squarely arranged. The four PD's 28a to 28d in FIG. 5 are put together so as to form crossing borderlines such that the borderlines are oriented parallel to and vertical to a plane defined by a direction in which the two reflection surfaces of the triangular prism as the light reflecting means 27 oppose each other, but may alternatively be put together such that the borderlines are shifted by an angle of 45 degrees from the above-described orientation shown in FIG. 5, which will be detailed later with reference to FIG. 7.

Figure 6:
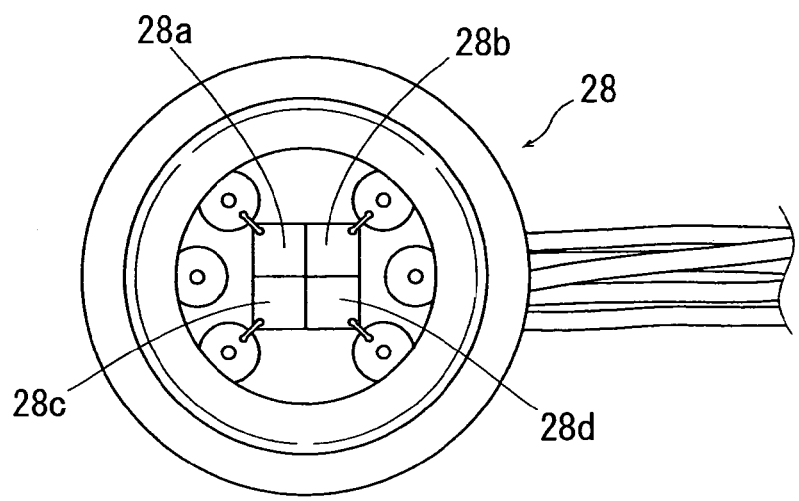
FIG. 6 is a plan view of a light receiving face of an optical sensor shown in FIG. 5.

Referring to FIG. 6, the optical sensor 28 has the four PD's 28a to 28d arranged at its light receiving face, on which light emitted from the light source 26 and reflected at the light reflecting means 27 impinges. Light is desired to impinge on the light receiving face in such a manner that its optical axis is oriented perpendicular to the face and positioned at the center of the face, that is, at the crossing point made by the borderlines of the four PD's 28a to 28d.

Figure 7:
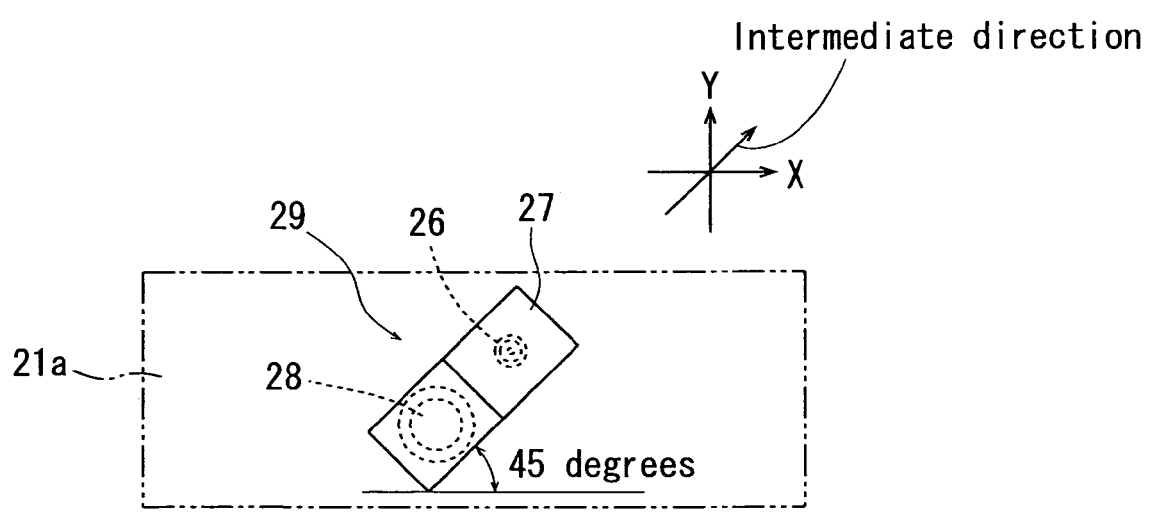
FIG. 7 is an explanatory side view of the optical sensor unit of FIG. 5 viewed from a direction A indicated in FIG. 4.

Referring to FIG. 7, the direction in which the two reflection surfaces of the triangular prism (the light reflecting means 27) oppose each other is not oriented square with the direction of two axes (X and Y axes) with respect to which displacement is detected by the optical sensor unit 29. Specifically, the opposing direction is oriented along an intermediate direction between the X and Y directions, that is to say, shifted by an angle of 45 degrees from both the X and Y axis directions. With such an arrangement, displacement with respect to the X and Y axis directions can be detected by the optical sensor unit 29.

In the arrangement described above, when the support section 22 and the action section 23 are displaced relative to each other, a variation is generated in a ratio of light amounts received at respective PD's 28a to 28d on each of the three optical sensor units 29. The variation is measured for calculation of displacements with respect to the X and Y axis directions, and the six-axis force sensor 20 figures out six-axis direction forces according to the calculated displacements by a well-known method and outputs a signal.

The arrangement shown in FIG. 4 is such that the light reflecting means 27 are disposed at the support section 22 while the light sources 26 and the optical sensors 28 are disposed at the action section 23, but the present invention is not limited to the arrangement, and an alternative arrangement may be such that the light reflecting means 27 are disposed at the action section 23 while the light sources 26 and the optical sensors 28 are disposed at the support section 22.

Figure 8:
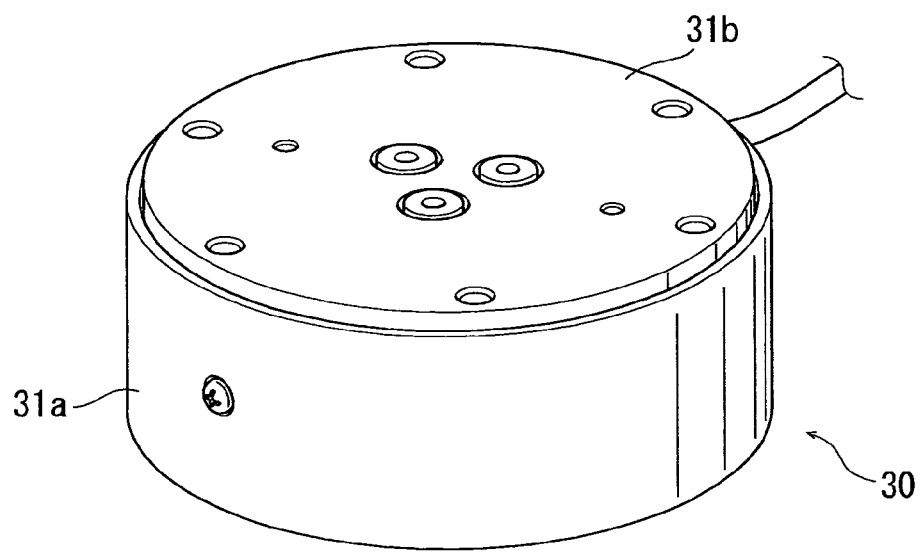
FIG. 8 is a perspective view of a six-axis force sensor according to a second embodiment of the present invention.
Figure 9:
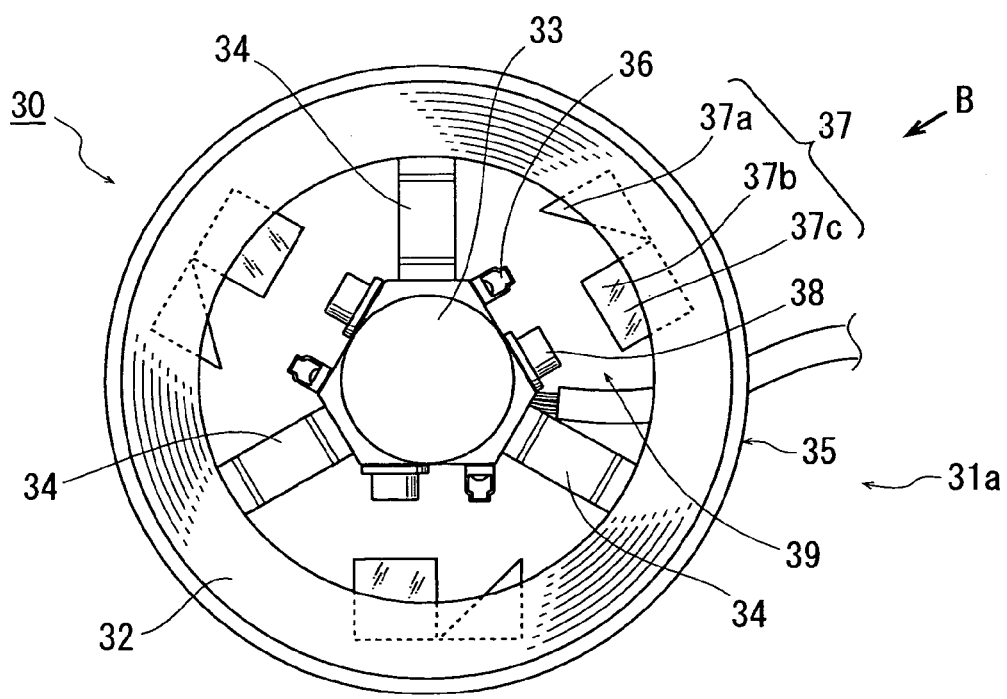
FIG. 9 is a top plan view of a main body of the six-axis force sensor of FIG. 8.

Referring now to FIG. 8, a six-axis force sensor 30 according to a second embodiment of the present invention is structurally composed of a cylindrical main body 31a, a disk-like top lid 31b, and a disk-like bottom lid (not seen), and houses a control board (not seen) inside the main body 31a. Referring to FIG. 9, the main body 31a is constituted basically by a frame 35, which integrally includes: a cylindrical support section 32; an action section 33 disposed centrally inside the support section 32 and adapted to receive an external force; and three elastic spoke sections 34 crookedly structured so as to readily provide elastic deformation in all directions and supportably connecting the action section 33 to the support section 32. The frame 35 is made of a single piece of an aluminum alloy material and shaped by cutting and electric discharge machining. The support section 32 and the action section 33 are fixed respectively to two components to which a measurement force is applied, and when the applied force acts on the six-axis force sensor 30 structured as described above, micro-displacements with respect to three-axis directions and micro-rotations with respect to rotational directions thereabout are generated between the support section 32 and the action section 33.

The six-axis force sensor 30 has three light reflecting means 37 disposed at the inner circumference of the support section 32 at 120 degree intervals (i.e. at an equi-angular distance), three light sources 36 disposed at the action section 33 at 120 degree intervals (i.e. at an equi-angular distance), and three optical sensors (light receiving elements) 38 disposed at the action section 33 at 120 degree intervals (i.e. at an equi-angular distance) so as to sit next to respective three light sources 36. Each of the light reflecting means 37 is composed of three light reflector members 37a to 37c. One each of the light reflecting means 37, the light sources 36, and the optical sensors 38 constitute an optical sensor unit 39, where the light reflecting means 37 opposes the light source 36 and the optical sensor 38 sitting next to the light source 36.

Figure 10A:
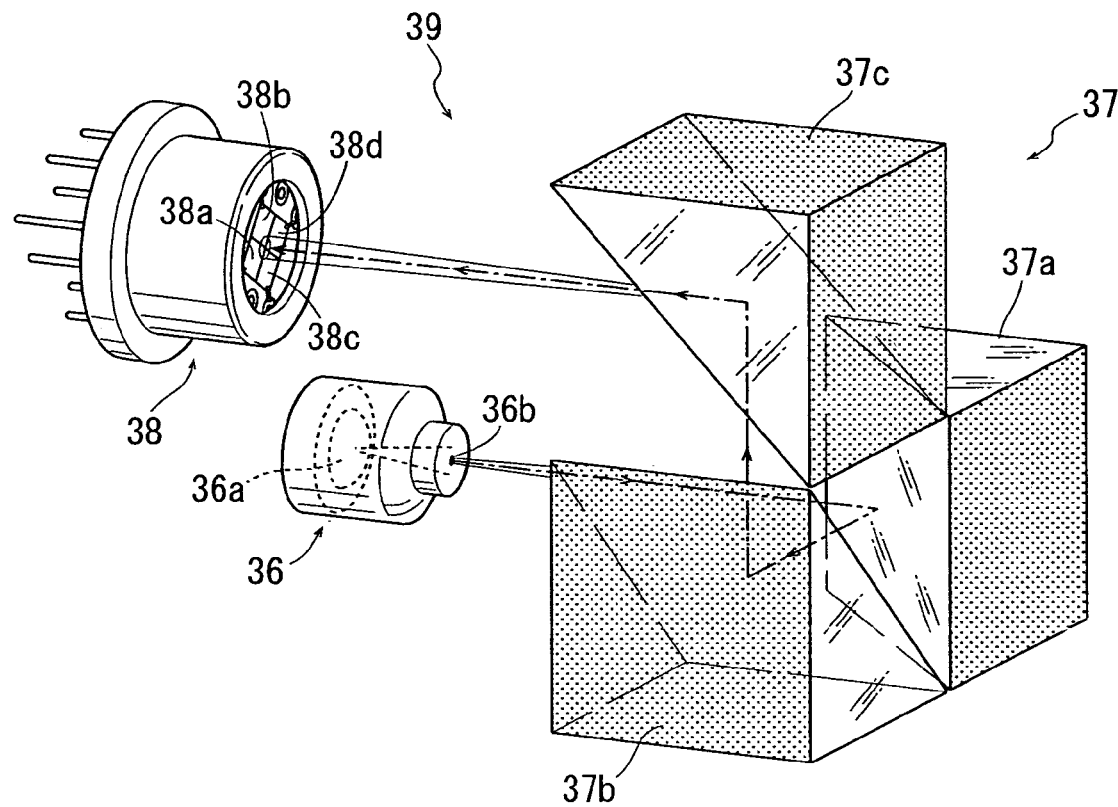
FIG. 10A is an explanatory perspective view of an optical sensor unit shown in FIG. 9.

Referring to FIG. 10A, the light source 36 is constituted by an LED 36a with a pinhole aperture 36b provided at its front face, and light emitted from the LED 36a and passing through the pinhole aperture 36b propagates diffusedly, impinges on the light reflector member 37a to be reflected thereat, impinges on the light reflector member 37b to be reflected thereat, then impinges on the reflector 37c to be reflected thereat, and is irradiated on the optical sensor 38.

Figure 10B:
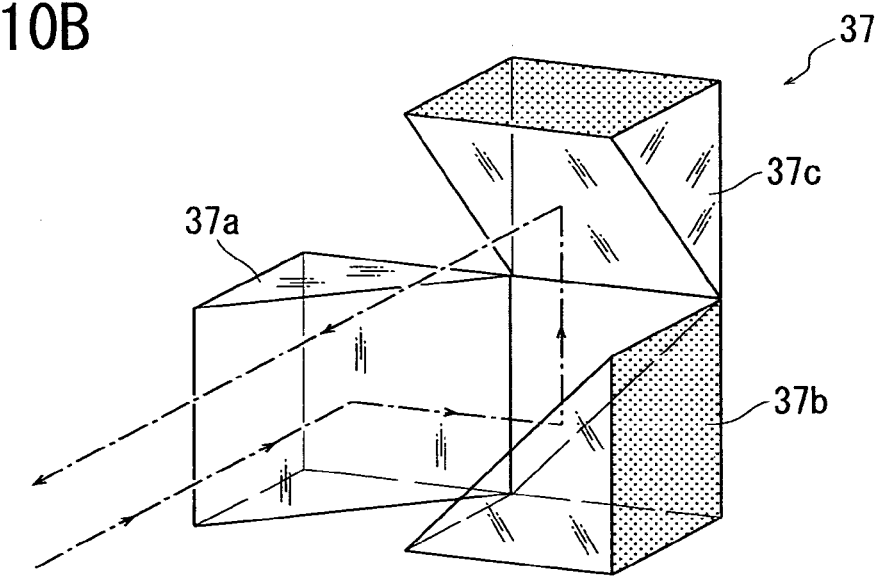
FIG. 10B is an explanatory perspective view of a light reflecting means shown in FIG. 10A, viewed from a different direction.

Referring to FIG. 10B as well as FIG. 10A, the three light reflector members 37a, 37b and 37c are each constituted by a triangular mirror, and respectively have first, second and third reflection surfaces which are arranged such that the first reflection surface (37a) reflects light emitted from the light source 36 in a direction perpendicular to the optical axis of the light from the light source 36, the second reflection surface (37b) reflects the light reflected from the first light reflector member 37a in a direction perpendicular both to the optical axis of the light from the light reflector member 37b and to the optical axis of the light emitted from the light source 36 and propagating toward the first light reflector member 37a, and that the third reflection surface (37c) reflects perpendicularly the light reflected from the second light reflector member 37b toward the optical sensor 38. In this connection, the light reflector members 37a, 37b and 37c may alternatively be constituted by plane mirrors.

Thus, the light source 36 and the optical sensor 38 are both disposed at the action section 33, whereby their wires can be installed together resulting in easier wiring work. Also, the optical axes of the light source 36 and the optical sensor 38 which are both disposed at the action section 33 so as to sit next to each other can be aligned to each other with less difficulty, and with further reduced difficulty when a housing is formed at the action section 33. And, the light source 36, the optical sensor 38, and also electronic circuit components such as an amplifier may be integrally packaged into an optical electronic component thereby enabling the six-axis force sensor 30 to be further downsized.

The optical sensor 38 is constituted by a PD assembly composed of four PD's 38a to 38d squarely arranged. The four PD's 38a to 38d in FIG. 10A are put together so as to form crossing borderlines such that the borderlines are oriented parallel to and vertical to a line defined by connecting the center of the light emitting source 37 and the center of the optical sensor 38, but may alternatively be put together such that the borderlines are oriented parallel to and vertical to the direction of the aforementioned light which is reflected from the first light reflector member 37a so as to propagate toward the second light reflector member 37b wherein the crossing borderlines are oriented coincident with the X and Y axis directions, with respect to which displacement is detected by the optical sensor unit 39. The light receiving face of the optical sensor 38 is arranged similarly to that of the optical sensor 28 shown in FIG. 6, and an explanation thereof is omitted.

Figure 11:
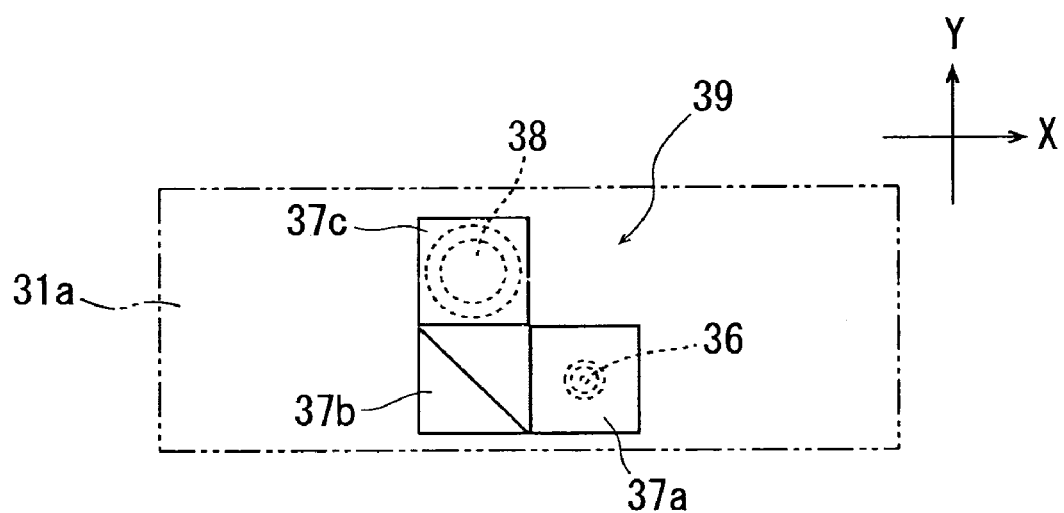
FIG. 11 is an explanatory side view of the optical sensor unit of FIG. 10A, viewed from a direction B indicated in FIG. 9.

FIG. 11 shows how the light source 36, the optical sensor 38, and the light reflecting means 37 (the three light reflector members 37a to 37c), which constitute each optical sensor unit 39, are arranged in relation to the aforementioned X and Y axes, when viewed from a direction B indicated in FIG. 9. In this arrangement, when the support section 32 and the action section 33 are displaced relative to each other, a variation is generated in a ratio of light amounts received at respective PD's 38a to 38d on each of the three optical sensor units 39. The variation is measured for calculation of the displacement with respect to the X and Y axis directions, and the six-axis force sensor 30 figures out six-axis direction forces according to the calculated displacement by a well-known method and outputs a signal.

The arrangement shown in FIG. 9 is such that the light reflecting means 37 composed of the three light reflector members 37a to 37c are disposed at the support section 32 while the light sources 36 and the optical sensors 38 are disposed at the action section 33, but the present invention is not limited to the arrangement, and an alternative arrangement may be such that the light reflecting means 37 are disposed at the action section 33 while the light sources 36 and the optical sensors 38 are disposed at the support section 32.

Figure 12A:
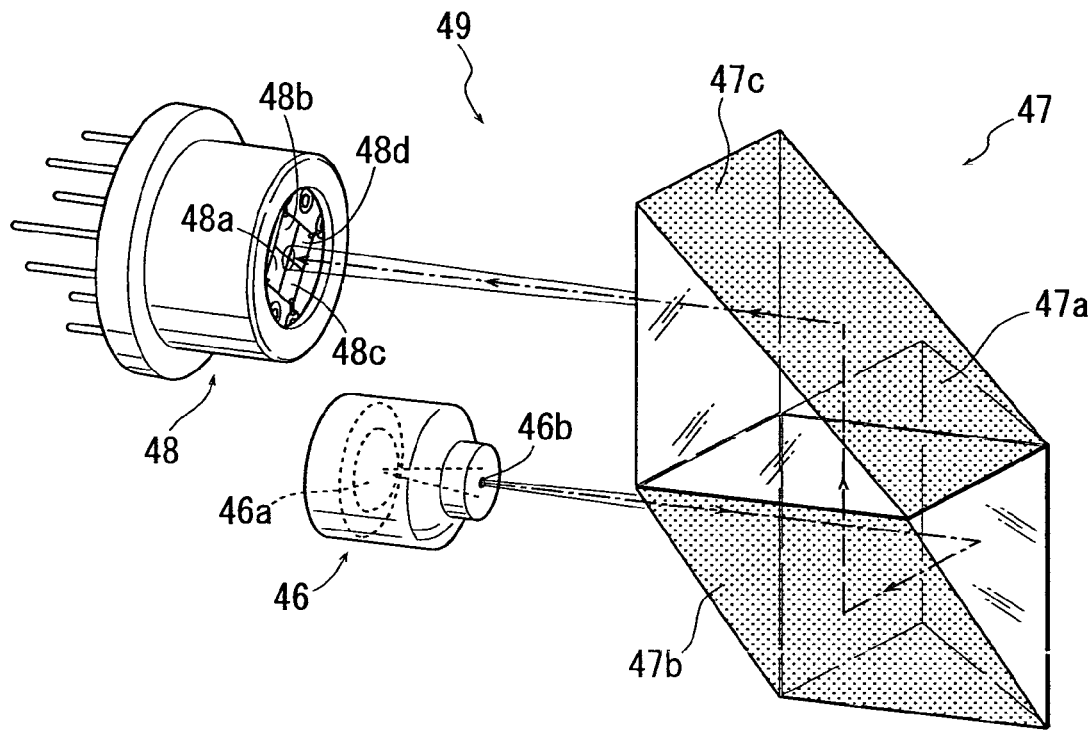
FIG. 12A is an explanatory perspective view of an optical sensor unit employing triangular prisms as a light reflecting means.
Figure 12B:
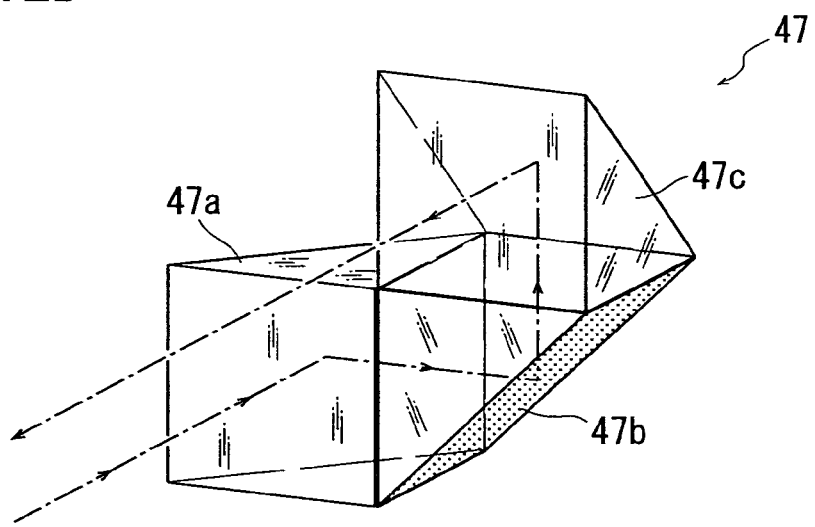
FIG. 12B is an explanatory perspective view of the light reflecting mans shown in FIG. 12A viewed from a different direction.

The light reflecting means 37 in FIGS. 9, 10A and 10B is composed of the three reflector members 37a to 37c which are constituted by triangular mirrors, but the present invention is not limited thereto, and the reflector members 37a to 37c may be replaced by reflector members constituted by triangular prisms as shown in FIGS. 12A and 12B. Referring to FIG. 12A, an optical sensor unit 49 comprises a light source 46, a light reflecting means 47, and an optical sensor 48. The light source 46 is constituted by an LED 46*a* with a pinhole aperture 46*b* provided at its front face, the light reflecting means 47 is composed of three reflector members 47*a* to 47*c* constituted by triangular prisms as described above, and the optical sensor 48 is constituted by a PD assembly composed of four PD's 48*a* to 48*d*.

Referring to FIGS. 12B as well as 12A, light emitted from the LED 46*a* and passing through the pinhole aperture 46*b* propagates diffusedly, impinges on the reflector member 47*a* to be reflected thereat toward the reflector member 47*b*, impinges on the reflector member 47*b* to be reflected thereat toward the reflector member 47*c*, then impinges on the reflector member 47*c* to be reflected thereat, and is irradiated on the optical sensor 48.

It is experimentally verified that in the second embodiment, the displacement amount of light received at an optical sensor is $\sqrt{2}$ times as large as the displacement amount of the light reflecting means composed of three reflector members. This results in improving the accuracy of detection.

Figure 13A:
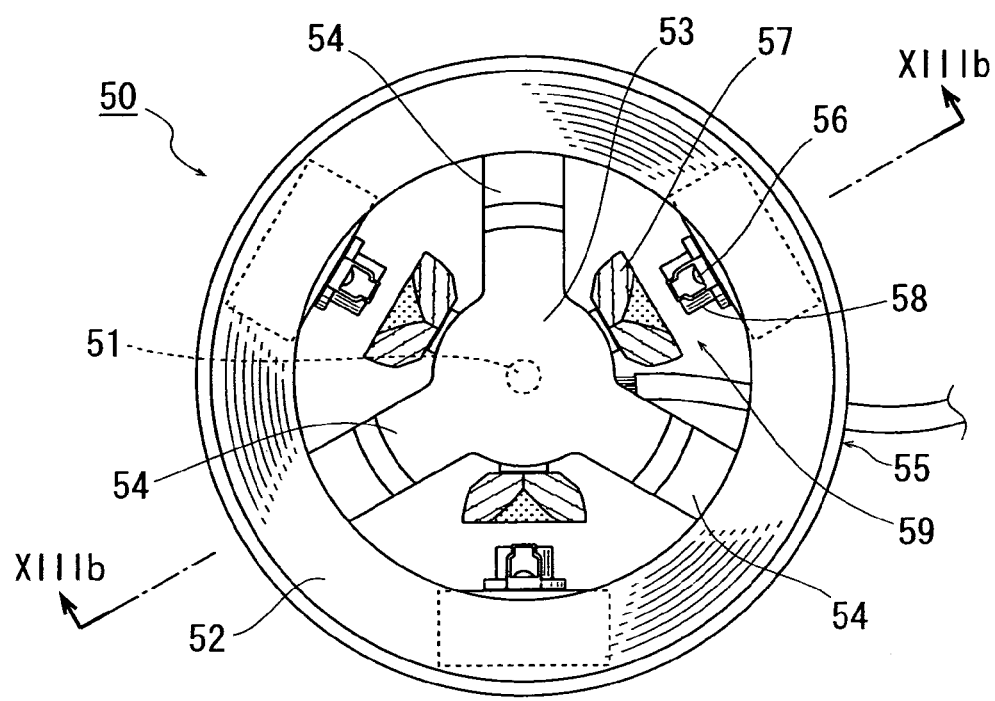
FIG. 13A is a top plan view of a main body of a six-axis force sensor according to a third embodiment of the present invention.
Figure 13B:
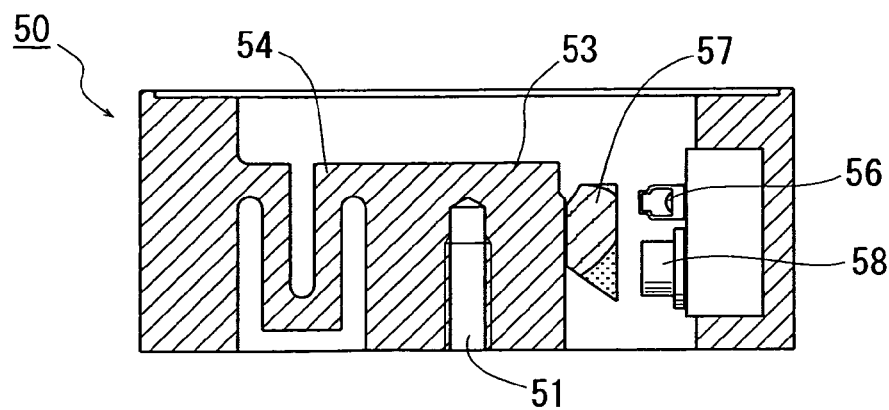
FIG. 13B is a cross-sectional view thereof taken along a line XIIIb.

Referring to FIGS. 13A and 13B, a main body of a six-axis force sensor 50 according to a third embodiment of the present invention is basically constituted by a frame 55, which integrally includes: a cylindrical support section 52; an action section 53 disposed centrally inside the support section 52 and adapted to receive an external force; and three elastic spoke sections 54 crookedly structured (refer to FIG. 13B) so as to readily provide elastic deformation in all directions and supportably connecting the action section 53 to the support section 52. The frame 55 is made of a single piece of an aluminum alloy material by cutting and electric discharge machining, and the spoke sections 54. The support section 52 and the action section 53 are fixed respectively to two components to which a measurement force is applied, and when the applied force acts on the six-axis force sensor 50 structured as described above, micro-displacements with respect to three-axis directions and three-axis micro-rotations with respect to rotational directions thereabout are generated between the support section 52 and the action section 53.

The six-axis force sensor 50 has three light reflecting means 57 disposed at the action section 53 at 120 degree intervals (i.e. at an equi-angular distance), three light sources 56 disposed at the action section 53 at 120 degree intervals (i.e. at an equi-angular distance), and three optical sensors (light receiving elements) 58 disposed at the inner circumference of the support section 52 at 120 degree intervals (i.e. at an equi-angular distance) so as to sit next to respective three light sources 56. The light reflecting means 57 are constituted by corner cube mirrors, which are retro-reflector members. One each of the light reflecting means 57, the light sources 56, and the optical sensors 58 constitute an optical sensor unit 59, where the light reflecting means 57 opposes the light source 56 and the optical sensor 58 sitting next to the light source 56.

Figure 14:
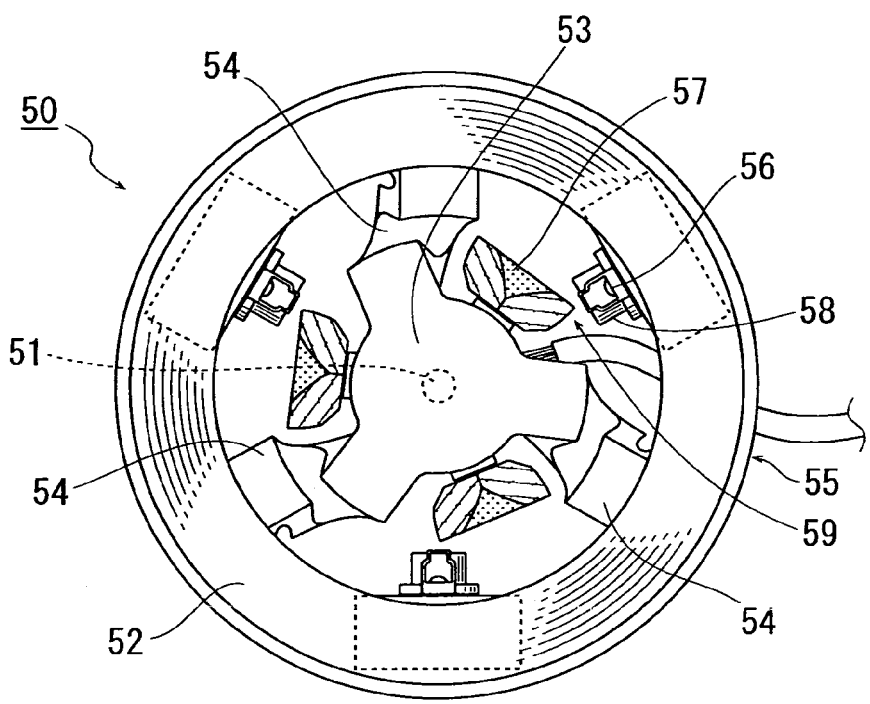
FIG. 14 is a top plan view of the six-axis force sensor of FIG. 13A subjected to a force couple acting with respect to a rotational direction about a center axis of the sensor.
Figure 15:
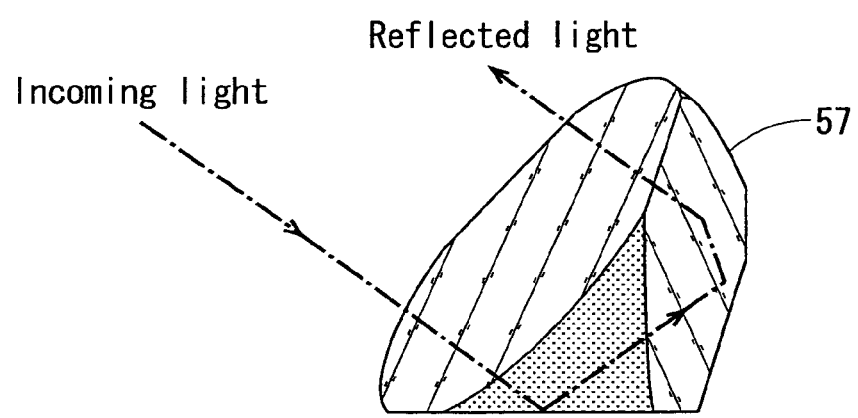
FIG. 15 is an explanatory perspective view of a corner cube mirror employed in the six-axis force sensor of FIG. 13A showing an optical path of light traveling therethrough.

The operation of the six-axis force sensor 50 of FIG. 13A, in conjunction with the six-axis force sensor 30 of FIG. 9, will be described with reference to FIGS. 14 and 15. Referring to FIG. 14, the six-axis force sensor 50 is subjected to a force couple acting about its center axis 51, where the amount of displacement is shown exaggeratedly (about 100 times as large as actual). A force couple (Mz) about a center axis of a six-axis force sensor is supposed to be detected such that displacement occurs in an X axis direction but not in a Y axis direction, where the X axis direction is a rotational direction about, for example, the center axis 51 of the action section 53 while the Y axis direction is a direction parallel to the center axis 51 of the action section 53.

When the six-axis force sensor 30 in FIG. 9 is subjected to a force couple (Mz) acting about its center axis like the six-axis force sensor 50 as shown in FIG. 14, twist occurs at the spoke sections 34 thereby causing the light sources 36 and the optical sensors 38 to be displaced relative to the light reflecting means 37 by X, and at the same time causing a rotation thus detecting a component Sy (Y axis component at the optical sensor 38), too. Accordingly, for example, rated load has to be lowered so as to reduce influence of the rotation so that high-accuracy sensing performance can be achieved when a force couple is applied.

In the six-axis force sensor 50, the light reflecting means 57 which are constituted by corner cube mirrors are employed-in place of the light reflecting means 37 composed of the light reflector members 37*a* to 37 which are constituted by triangular mirrors in the six-axis force sensor 30. Since the corner cube mirror has a reflection characteristic almost free of rotation angle independence, light is reflected constantly parallel to incoming light as shown in FIG. 15 and displacement is scarcely caused.

Figure 16A:
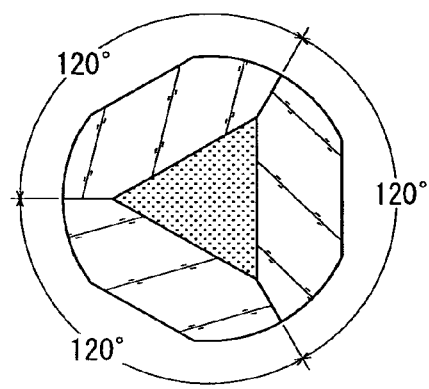
FIGS. 16A to 16F are views of one example of a corner cube mirror viewed from different directions.
Figure 16D:
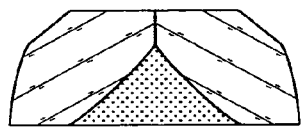
Figure 16B:
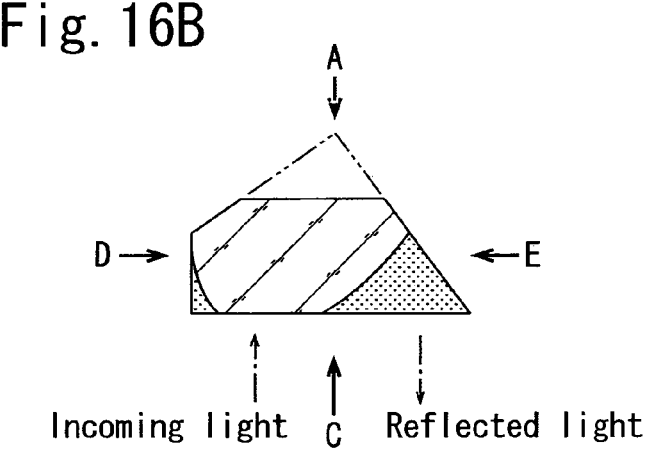
Figure 16E:
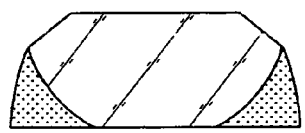
Figure 16C:
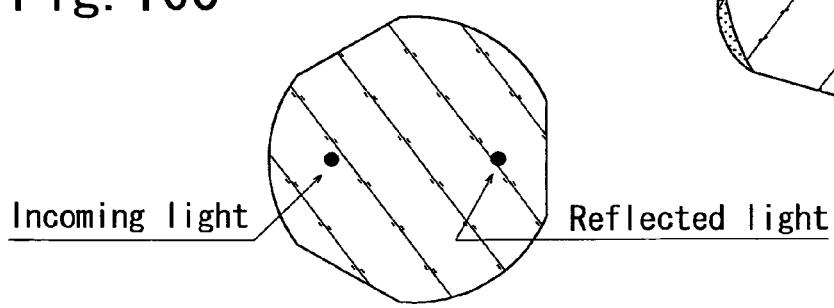
Figure 16F:
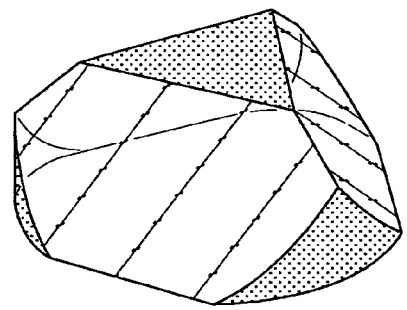

FIGS. 16A to 16F shows one example of a corner cube mirror as the light reflecting means 57, wherein FIG. 16A is a plan view thereof seen from a direction A indicated in FIG. 16B, FIG. 16B is a side view thereof with its light incident/exit surface facing downward, FIG. 16C is a plan view of the light incident/exit surface thereof, FIG. 16D is a side view thereof seen from a direction D indicated in FIG. 16B, FIG. 16E is a side view thereof seen from a direction E indicated in FIG. 16B, and FIG. 16F is a perspective view thereof. As shown in FIG. 16B, the corner cube mirror is truncated so that the six-axis force sensor 50 can be downsized in its radial dimension. The corner cube mirror does not have to be shaped as shown in FIGS. 16A to 16F and may be shaped otherwise, or the light reflecting means 57 may alternatively be constituted by a retro-reflector member which is composed of three mirrors arranged perpendicularly to one another at their inner corners.

Figure 17:
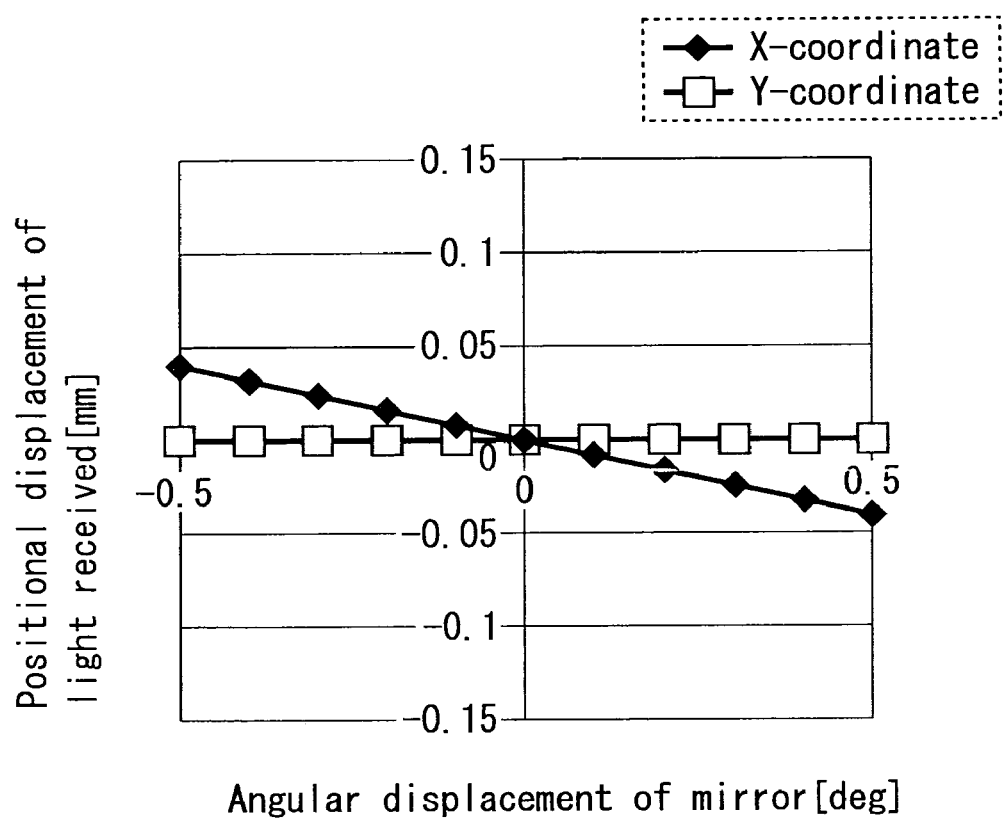

Referring to FIG. 17 showing a test result on the six-axis force sensor 50 subjected to a force couple as illustrated in FIG. 14, the horizontal axis represents an angle of rotation of the corner cube mirror caused due to the Mz force couple, and the vertical axis represents an amount of displacement of light receiving position at the optical sensor 58 caused due to the Mz force couple. Also, ♦ indicates an amount of displacement with respect to the X axis direction while □ indicates an amount of displacement with respect to the Y axis direction. As known from the test result shown in FIG. 17, the light reflecting means 57 constituted by the corner cube mirror prevents detection of displacement with respect to the Y axis direction when the Mz force couple is applied. It is experimentally verified that in the six-axis force sensor 50 shown in FIG. 13, the displacement amount of light received at the optical sensor 58 is two times as large as the displacement amount of the light reflecting means 57, namely, the corner cube mirror. This results in improving the accuracy of detection.

An optical displacement sensor according to the present invention can be used in an external force detecting apparatus such as a six-axis force sensor as described above and may further be used to measure various physical quantities that can be detected according to displacement amounts.

While the present invention has been illustrated and explained with respect to specific embodiments thereof, it is to be understood that the present invention is by no means limited thereto but encompasses all changes and modifications that will become possible within the scope of the appended claims.

What is claimed is:

1. An external force detecting device comprising:
an action section to receive an external force;
a support section to support the action section; and
at least one optical displacement sensor including a light source, a light receiving element, and a light reflecting means, wherein the light source and the light receiving element are disposed at one of the action section and the support section while the light reflecting means is disposed at the other one thereof at which the light source and the light receiving element are not disposed, and wherein light emitted from the light source is reflected at the light reflecting means and received at the light receiving element, whereby displacement of the action section in relation to the support section is detected and outputted as a signal according to which an external force applied to the action section is calculated, and wherein the optical displacement sensor is capable of detecting displacement with respect to two-axis directions of a plane perpendicular to an optical central axis of light emitted from the light source, and wherein the light reflecting means defines two reflection surfaces which make an angle of 90 degrees with each other, and which respectively make an angle of 45 degrees with the optical central axis of light emitted from the light source, and wherein a direction in which the two reflection surfaces oppose each other coincides with an intermediate direction between the two-axis directions with respect to which displacement is detected.

2. An external force detecting device according to claim 1, wherein the light reflecting means is constituted by one of a trapezoidal prism, a triangular prism, and a dove prism.

3. An external force detecting device according to claim 1, wherein the light source and the light receiving element are disposed in a same housing.

4. An external force detecting device according to claim 1, the light source is constituted by a light emitting diode, and the light receiving element is constituted by a photodiode.

5. An external force detecting device according to claim 1, wherein a plurality of optical displacement sensors are provided, and wherein the two-axis directions with respect to which displacement is detected are oriented different from one optical displacement sensor to another.

6. An external force detecting device comprising:
an action section to receive an external force;
a support section to support the action section; and
at least one optical displacement sensor including a light source, a light receiving element, and a light reflecting means, wherein the light source and the light receiving element are disposed at one of the action section and the support section while the light reflecting means is disposed at the other one thereof at which the light source and the light receiving element are not disposed, and wherein light emitted from the light source is reflected at the light reflecting means and received at the light receiving element, whereby displacement of the action section in relation to the support section is detected and outputted as a signal according to which an external force applied to the action section is calculated, and wherein the optical displacement sensor is capable of detecting displacement with respect to two-axis directions of a plane perpendicular to an optical central axis of light emitted from the light source, and wherein the light reflecting means defines first, second and third reflection surfaces, wherein the first reflection surface reflects light emitted from the light source in a direction perpendicular to an optical center axis of the light, the second reflection surface reflects light coming from the first reflection surface in a direction perpendicular to an optical center axis of the light coming from the first reflection in a plane perpendicular to the light coming from the light source, and wherein the third reflection surface reflects light coming from the second reflection surface in a direction toward the light receiving element.

7. An external force detecting device according to claim 6, wherein the light reflecting means is constituted by one of a triangular prim assembly and a mirror assembly.

8. An optical displacement sensor comprising:
a light source;
a light receiving element; and
a light reflecting means, wherein the light source and the light receiving element are disposed at one object while the light reflecting means is disposed at another object, and wherein light emitted from the light source is reflected at the light reflecting means and received at the light receiving element, whereby displacement of the one object in relation to the another object is detected, and wherein the light reflecting means defines two reflection surfaces which make an angle of 90 degrees with each other, and which respectively make an angle of 45 degrees with the optical central axis of light emitted from the light source, and wherein a direction in which the two reflection surfaces oppose each other coincides with an intermediate direction between the two-axis directions with respect to which displacement is detected.

* * * * *